United States Patent [19]

Morris

[11] Patent Number: 4,833,633

[45] Date of Patent: May 23, 1989

[54] OPTO-ELECTRONIC RANDOM NUMBER GENERATING SYSTEM AND COMPUTING SYSTEMS BASED THEREON

[75] Inventor: George M. Morris, Rochester, N.Y.

[73] Assignee: University of Rochester, Rochester, N.Y.

[21] Appl. No.: 664,893

[22] Filed: Oct. 25, 1984

[51] Int. Cl.[4] .................. G06F 1/00

[52] U.S. Cl. .................. 364/717

[58] Field of Search .................. 364/717, 822, 521, 516, 364/713; 250/363 R, 366, 369, 505; 356/35.5, 36-38; 200/204

[56] References Cited

U.S. PATENT DOCUMENTS

| | | | |
|---|---|---|---|
| 3,011,057 | 11/1961 | Anger | 250/204 |
| 3,748,470 | 7/1973 | Barrett | 250/366 |
| 4,058,113 | 11/1977 | Fields | 128/745 |
| 4,403,777 | 9/1983 | Del Principe et al. | 273/313 |
| 4,577,184 | 3/1986 | Hodara et al. | 340/566 |

OTHER PUBLICATIONS

Gloenko, "Physical Generation of Uniformly Distributed Random Variables in the Monte Carlo Method," Y. A. Shreider, ed. (Pergamon, Oxford, 1966), pp. 257-305.

Firmani et al, "High-Resolution Imaging with a Two-Dimensional Resistive Anode Photon Counter", Rev. Sci. Instrum. 53(3), May 1982, pp. 570-574.

Electro-Optical Products Division ITT, "Tube Type: F4146 Microchannel Plate Imaging Photomultiplier Tube", Rev. 12/83.

Electro-Optical Products Division, "Mepsicron Resistive Anode Image Converter Objective Specification", Rev. 4/82.

Surface Science Lab., Inc., "The Most Sensitive Imaging Detectors Known", Aug. 4, 1982.

Morris, "Scene Matching Using Photon-Limited Images", J. Opt. Soc. Am. A/vol. 1, No. 5, May 1984, pp. 482-488.

*Primary Examiner*—Gary V. Harkcom
*Assistant Examiner*—Tan V. Mai
*Attorney, Agent, or Firm*—Martin LuKacher

[57] ABSTRACT

Images having specified illumination intensity distributions are used at low light levels to produce photoevents which are electronically detected to generate random numbers having probability density distributions which correspond to the specified illumination intensity distribution and at very high rates, e.g., one hundred thousand numbers per second. These random numbers are used to operate the systems which are based upon random processes such as can be expressed in Monte Carlo algorithms, for example using a Markov process, which systems include computers to carry out the random processes.

16 Claims, 2 Drawing Sheets

OPTO-ELECTRONIC RANDOM NUMBER GENERATING SYSTEM AND COMPUTING SYSTEMS BASED THEREON

The U.S. government has rights in this invention under contract no. DAAG 29-81-K-0134.

BACKGROUND OF THE INVENTION

The present invention relates to opto-electronic systems which operate in accordance with both optical and electronic processes, and particularly to a system for generating random numbers opto-electronically.

The invention is especially suitable for use in providing computing systems which are based on random processes, for example as can be expressed by Monte Carlo algorithms such as may be used to calculate definite integrals and to perform matrix inversion and to solve other multi-dimensional problems.

Various sources of random numbers have been suggested for use in computing systems which are based on random processes. Some of these sources involve the use of computers to generate a sequence of numbers. These numbers are produced by a deterministic algorithm which may have the statistical properties of a random sequence, but is of limited length so that the sequence or some part of it will repeat after the length limit is exceeded. Such sequences are known as pseudorandom. There are physical random number generators which provide true random sequences. These are based on shot noise fluctuations in electronic circuits or gas discharges; some are based upon atomic particle emissions. Reference may be made to D. I. Gloenko, "Physical Generation of Uniformly Distributed Random Variables in the Monte Carlo Method," Y. A. Shreider, ed. (Pergamon, Oxford, 1966), 257–305.

Such random number generators provide numbers that do not follow a specified distribution. A transformation is then required to obtain deviates that follow the specified distribution. Such transformations can reduce drastically the rate at which the random numbers are generated.

SUMMARY OF THE INVENTION

It has been discovered in accordance with the invention that random numbers can be generated using the spatial statistics of photon-limited images to produce random numbers, and even bivariate random numbers, with any specified distribution, and at rates on the order of one hundred thousand random numbers per second. These random numbers, which fit the specified distribution, may be used for simulation of physical phenomena and in computing systems which are based on random processes, for example, which have algorithms for Monte Carlo solutions to numerical problems. Such Monte Carlo algorithms may be used in systems for the evaluation of definite integrals and the inversion of matrices, and for the solution of eigenvalue problems, boundary value problems, systems of linear algebraic equations, and integral equations.

Briefly described, the invention, which is useful in a system which utilizes random numbers, provides a random number generator having means for detecting photoevents. The generator includes means for illuminating the detecting means with an image having a specified intensity distribution. This image may be generated with the aid of a computer, for example, to provide a matrix display in the form of a checkerboard which has the distribution necessary to solve a matrix problem using a Monte Carlo method. The image is formed over the area of the detector which links the optical and electronic parts of the opto-electronic random number generating system. The intensity of the image is limited, for example by a pinhole camera or neutral density filter-imaging lens system, which forms the image on the detector, so that the photoevents occur at a specified rate. This rate may be, for example, one photoevent every ten microseconds. Means are associated with the photodetector for deriving random number outputs having a probability density in accordance with the intensity distribution of the image and in accordance with the spatial coordinates of the photoevents detected by the detector. The detector may be a two-dimensional photon event detector made up of a photon counting detector and position computer. The output of the position computer is the digital address of the x and y coordinates of the detected photoevent. The numbers represented by these coordinates are produced in accordance with a bivariate probability density function determined by the optical intensity function which is represented by the image, with the capability of generating one hundred thousand bivariate random numbers per second.

It is therefore a feature of the present invention to provide improved opto-electronic systems capable of generating random numbers with specified probability density distributions and at very fast rates.

It is another feature of the invention to provide opto-electronic systems for generating random numbers, which may be bivariate random number sequences having probability density distributions which may be changed optically, as by changing a mask which provides an image having a spatial optical intensity distribution corresponding to the probability density distribution of the random numbers which is specified, or by changing a computer generated display.

BRIEF DESCRIPTION OF THE DRAWINGS

Other features, objects and advantages of the invention, as well as presently preferred embodiments thereof, will become more apparent from a reading of the following description in connection with the accompanying drawing in which.

DETAILED DESCRIPTION

Figure 1:
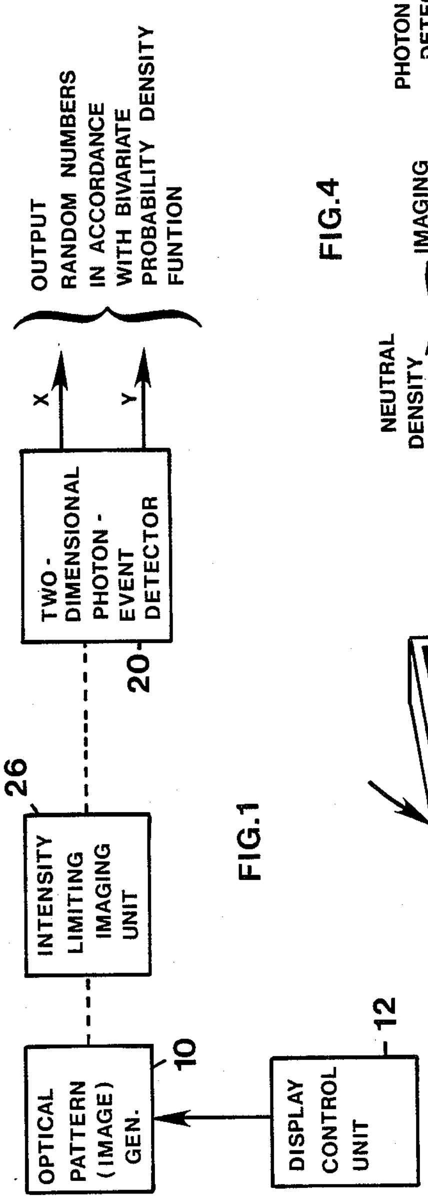
FIG. 1 is a block diagram of an opto-electronic system for generating random numbers in accordance with a specified bivariate probability density function.
Figure 4:
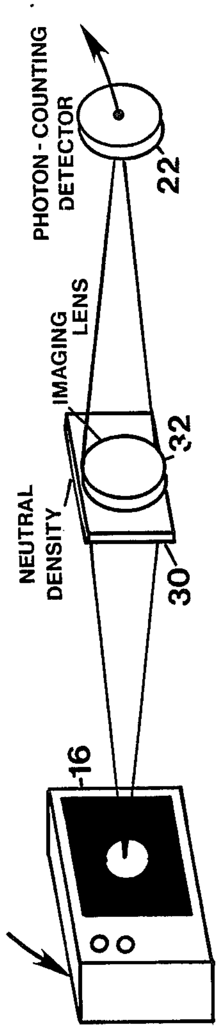
FIG. 4 is a schematic diagram of a system similiar to that shown in FIG. 3 wherein the intensity limiting imaging unit utilizes a neutral density filter and imaging lens, rather than a pinhole camera as shown in FIG. 3.
Figure 3:
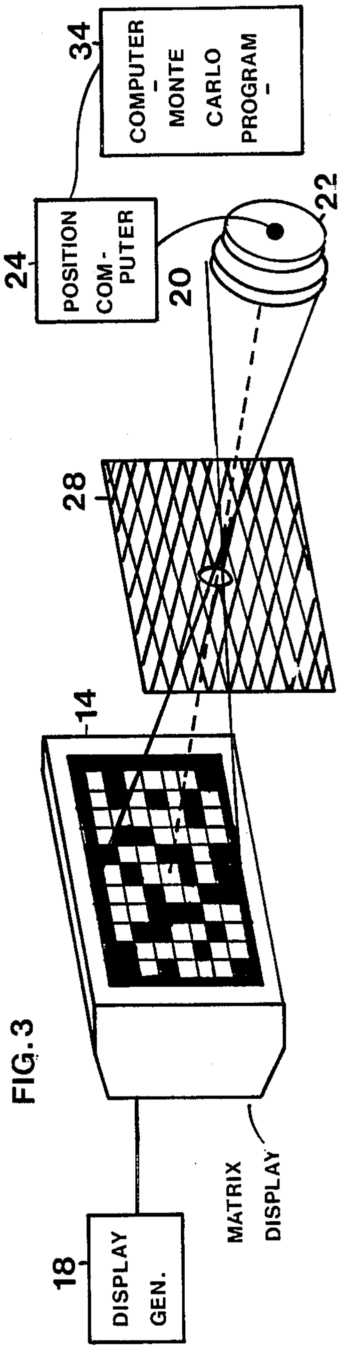
FIG. 3 is a diagram schematically illustrating an optical computing system utilizing a random number generator of the type illustrated in FIG. 1 which is especially suitable for matrix solutions for systems of linear algebraic equations.

Referring first to FIG. 1 there is shown an optical pattern generator 10. The pattern generator may be a slide projector where different transparencies are used to create an image or optical map having a specified intensity distribution. While a transparency such as a piece of film or an object may be used to create the image, it is preferred to use a cathode-ray tube display which is operated by a display control unit 12. In FIGS. 3 and 4, for example, cathode-ray tube display units 14 and 16 are shown which are operated by a display generator 18. The display generator may be a computer such as a micro- or personal computer which can be programmed in accordance with well-known computer graphic techniques to generate on the screen an image having the requisite spatial intensity distribution. FIG. 3 shows a checkerboard matrix that is a checkerboard pattern with the intensity (or excitance) of each square proportional to the probability of a transition in a matrix. Matrix solutions to linear algebraic equations which involves such matrices are known as the von Neumann and Ulam Monte Carlo method. Further information with respect to such methods, which are utilized in the computer systems to be described hereinafter, may be obtained from an article by G. E. Forsythe and R. A. Liebler, "Matrix Inversion by a Monte Carlo Method," MTAC (Math Tables and Aids to Computation) 4, 127–129 (1950).

The image is formed on a detection area presented by a two-dimensional photon event detector 20. The detector 20 is preferably a two-dimensional photon event counting detector using a microchannel image intensifier having a resistive anode which is coupled to a position computer. Various types of two-dimensional photon event counting detectors are discussed in a recent article by the Applicant hereof, G. M. Morris, "Scene Matching Using Photon-Limited Images," J. Opt. Soc. Am. A/Vol. 1, No. 5, 482–488 (May 1984). The resistive anode photon event detector and the position determining computer thereof which provides outputs x and y, in accordance with the spatial coordinates of the detected photoevents is described in greater detail in C. Firmani and E. Ruiz, "High-Resolution Imaging With a Two-Dimensional Resistive Anode Photon Counter," Rev. Sci. Instrum. 53(5), 570–574 (May 1982). A suitable photodetector tube may be the type F4146 microchannel plate imaging photomultiplier tube which is supplied by the Electro-Optical Products Division ITT, 37 East Pontiac Street, Fort Wayne, Ind. The position computer suitable for use in the detector 20 may be the model 2401 produced by Surface Science Laboratories, Inc., 1206 Charleston Road, Mountain View, Calif.

In FIG. 3 the photodetector of the two-dimensional photon event detector 20 is shown at 22 connected to its position computer 24. Briefly, this detector 20 has a photocathode which presents an area on which the optical pattern from the generator 10 is imaged. The photocathode is followed by a microchannel plate image intensifier and a resistive anode. An electron emitted from the photocathode (a photoevent) at a certain location causes a multiplication of the electrons ("a splash of electrons") to be produced which strike the anode at a position corresponding to the position on the photocathode where the photon which caused the photoevent was incident. A charge due to the electrons is collected by electrodes attached to the corners of the anode, distributed according to the distances from the event location to the corners. The position computer determines the position of the photoevent by calculating the centroid of the collected charge. Additional computation logic provides the digital address for the spatial (x and y) coordinates of the detected photoevent. These addresses, x and y, are the output random numbers which are in accordance with a bivariate probability density function corresponding to the intensity distribution of the image incident on the photocathode 22 of the detector 20. The detector 20 can operate at very rapid rates, for example, detecting one photon every ten microseconds with a very high image resolution of 400 by 400 pixels.

In order to provide photoevents at the rate which can be handled by the detector 20, an intensity limiting imaging unit 26 is used. This unit may be a pinhole camera 28 as shown in FIG. 3 or a neutral density filter 30 followed by an imaging lens 32 as shown in FIG. 4. Accordingly, the light level at the detector 20 is low enough so that the detector responds to individual photoevents. The pinhole camera 28 stops down the aperture of the imaging system while the neutral density filter 30 reduces the intensity level directly. If the aperture of the pinhole camera 28 is small, an imaging lens is not needed to image the pattern on the area of the photodetector 22 (as shown in FIG. 3).

The following theory is presented to show the relationship between the intensity distribution of the image produced by the pattern generator 10 and the probability density function in accordance with the output random numbers are generated by the two-dimensional photon event detector 20 in accordance with the spatial coordinates of the photoevents imaged on the detector 20.

From the theory of photodetection, it is found that the probability of detecting a photoevent at spatial coordinates (x', y') is directly proportional to the classical intensity f(x'y') at this point. It follows that the conditional probability density function $p(x',y'|f(x',y'))$ for event coordinates (x'y') is $$p(x',y'|f(x',y')) = \frac{f(x',y')}{\iint_A f(x',y')dx'dy'}, \tag{1}$$

where A denotes the area of the photocathode. Hence, the spatial coordinates x' and y' of a detected photoevent represent continuous random variables with probability density function $p(x',y'|f(x',y'))$.

Note that any required bivariate probability density function can be obtained by providing the appropriate classical intensity f(x',y'). The intensity function f(x',y') can be obtained easily by using a transmission filter, or by modulating the intensity on a cathode-ray tube.

Figure 2C:
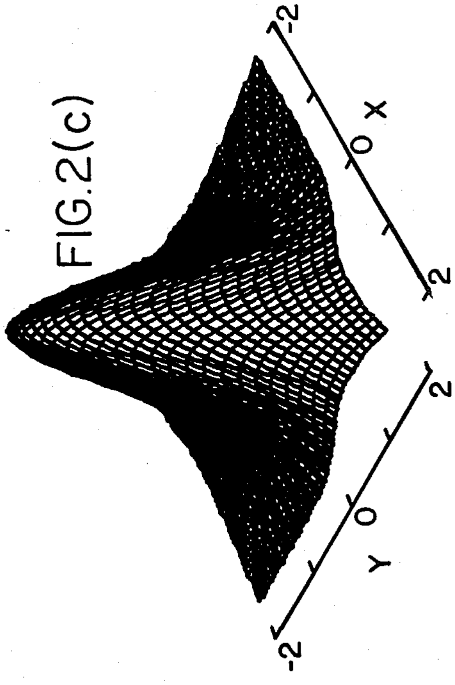
FIG. 2 (FIGS. 2A, B, and C) are examples of bivariate probability density functions in accordance with which random numbers can be generated with the system illustrated in FIG. 1; the figure showing in the curve of FIG. 2A uniform density function, in the curve of FIG. 2B a joint-normal density in which the random variables x and y are uncorrelated, and in the curve of FIG. 2C a joint-normal density in which the random variables x and y are correlated and specifically where the correlation coefficient is equal to 0.7.
Figure 2B:
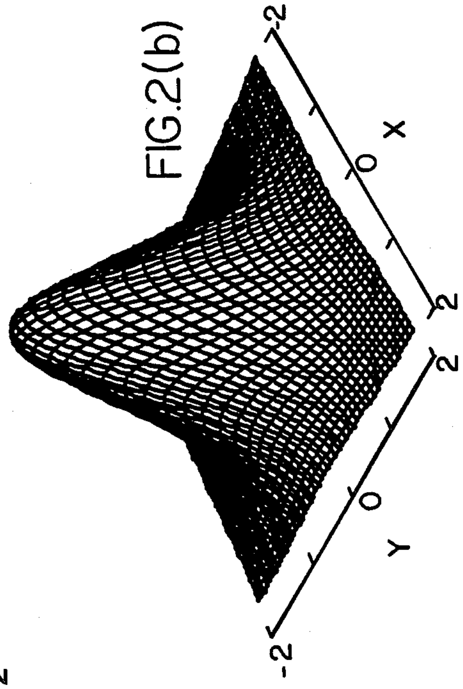
Figure 2A:
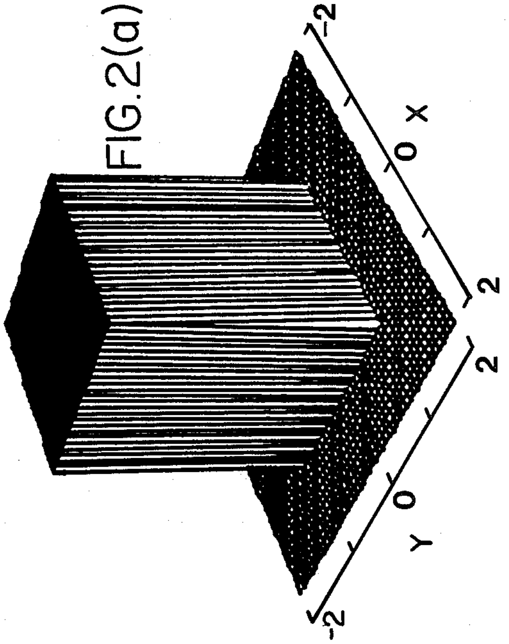

Some examples of bivariate probability density functions that can be generated using this method are shown in FIGS. 2(*a*)–2(*c*). In FIG. 2(*a*) the intensity is uniform over the area A=4, hence the probability density function is given by $p(x',y'|f(x',y')=1)=1/A$. In FIG. 2(*b*) the intensity distribution has the form $$f(x',y')=[1/(2\pi\sigma^2)]\exp[-(x'^2+y'^2)/[2\sigma^2]],$$

where $\sigma=1.0$; so the spatial coordinates x' and y' of a detected photoevent are uncorrelated, normally-distributed random variables. In FIG. 2(*c*) the intensity function is given by $$f(x',y') = \frac{1}{2\pi\sigma^2[1-\rho^2]^{\frac{1}{2}}} \exp\left[-\frac{(x'^2 + 2\rho x'y' + y'^2)}{2\sigma^2(1-\rho^2)}\right],$$

in which $\sigma=1.0$ and $\rho=0.70$. In this case the spatial coordinates x' and y' of a detected photoevent are correlated, normally-distributed random variables with correlation coefficient $\rho=0.70$.

It is therefore possible to generate any continuous bivariate probability density function with any required correlation coefficient.

The output of the position computer 24 of the detector provides random numbers which can be used to solve problems by Monte Carlo calculations. A digital computer may be programmed in accordance with Monte Carlo algorithms to solve these equations.

Consider the case where the computer 34 is programmed for the evaluation of definite integrals. Here, we consider the use of the optical random numbers generated by the photon event detector 20 to evaluate integrals of the form $$\iint_A f(x',y')h(x,y;x'y')dx'dy', \tag{2}$$

where f(x',y') is a real, non-negative function such that $$\int_A f(x',y')dx'dy' = 1,$$

h(x,y;x',y') can be any function—real or complex—and A is the area of the optical detector. The only other conditions on f(x',y') and h(x,y;x',y') are that they be measurable and bounded. Note that Eq. (2) has the form of a linear system in which f(x',y') represents the input, and h(x,y;x',y') is the system impulse response The input is provided by imaging a classical intensity object f(x',y') onto the two-dimensional, photon event counting detector 20 using either the pinhole camera 28 (FIG. 3) or the imaging lens 32 with sufficient neutral density in the filter 30 (FIG. 4) to reduce the photoevent rate to an acceptable level. The probability of detecting a photoevent at spatial coordinates x' and y' is given by Eq. (1). The probability of detecting N photoevents in a time interval $\tau$ obeys a conditional Poisson process, $$P(N|f(x',y')) = \frac{\bar{N}^N e^{-\bar{N}}}{N!} \tag{3}$$

in which the Poisson parameter $$\bar{N} = [\eta\tau/(h\bar{\nu})] \iint_A f(x',y')dx'dy' = [\eta\tau/(h\bar{\nu})], \tag{4}$$

where $\rho$ denotes the quantum efficiency of the detector, h is Planck's constant, $\bar{\nu}$ denotes the mean frequency of the quasimonochromatic illumination, and A is the area of the photo-cathode. Equation (3) is applicable when the illumination is provided by: (1) a well-stabilized single-mode laser; and (2) a polarized, thermal source when the integration time $\tau$ is much larger than the coherence time of the light.

The function h(x,y;x',y') is stored in computer memory.

To compute the integral in Eq. (2), N photoevents are detected in a time interval $\tau$, and the spatial coordinates of the detected photoevents are used to form the sum $$g(x,y) = \sum_{i=1}^{N} h(x,y;x_i,y_i), \tag{5}$$

where $(x_i,y_i)$ denotes the spatial coordinates of the i-th detected photoevent. In Eq. (5) the position coordinates $(x_i,y_i)$ of the detected photoevents and the number of photoevents N are random variables. It is noted that g(x,y) is a 2-D spatial analogue of a shot noise process.

Statistical momemts of g(x,y) can be calculated using the statistics of the detected photoevents. The expected value of g(x,y) is found to be $$<g(x,y)> = \bar{N} \iint_A dx'dy'f(x',y')h(x,y;x'y'), \tag{6}$$

where $\bar{N}=[\eta\tau/h\bar{\nu})]$ and $$\int_A f(x',y')dx'dy' = 1.$$

Thus, the required integral in Eq. (2) is the mean value of g(x,y) divided by the average number of detected photoevents $\bar{N}$.

The variance of g(x,y) is given by $$\sigma^2 = \bar{N} \iint_A dx'dy'f(x',y')h^2(x,y;x',y'). \tag{7}$$

An estimate of the error of the Monte Carlo method for evaluating the integral in Eq. (2) can be expressed as a ratio of the rms deviation from the mean to the mean of g(x,y), i.e.

$$\delta = \frac{\sigma}{<g(x,y)>} = \frac{1}{\bar{N}^{\frac{1}{2}}} \frac{\left[\iint_A dx'dy'f(x',y')h^2(x,y;x'y')\right]^{\frac{1}{2}}}{\iint_A dx'dy'f(x',y')h(x,y;x',y')} \tag{8}$$

One notes that a reduction in error of the Monte Carlo method results in a substantial increase in the required average number of detected photoevents, i.e.

$$\delta \sim 1/\bar{N}^{\frac{1}{2}};$$

hence, there is a practical limit on the accuracy that can be obtained. Typically, the error in a Monte Carlo calculation is of the order of 1% to 0.1% of the required value.

Consider how the system of FIG. 3 is operative for solving a system of linear algebraic equations, which was first proposed by von Neumann and Ulam;

$$\underline{A}\underline{x}=\underline{b}, \tag{9}$$

where $\underline{A}$ denotes an $n \times n$ matrix, and $\underline{x}$ and $\underline{b}$ represent $n \times 1$ vectors.

The case in which an iterative method can be used to solve the equations will be analyzed. Let the matrix $\underline{A}$ be represented in the form $$\underline{A}=\underline{I}-\underline{B}, \tag{10}$$

where $\underline{I}$ is the unit matrix, and all the eigenvalues of the matrix $\underline{B}$ lie within the unit circle. The stipulation on the eigenvalues of $\underline{B}$ is equivalent to the requirement that the matrix norm $$||B|| = \max_i \sum_j |B_{ij}| < 1. \tag{11}$$

The solution to the system of equations in Eq. (9) can be written in the form $$\underline{x}=A^{-1}\underline{b}=(\underline{I}-B)^{-1}\underline{b}. \tag{12}$$

If Eq. (11) is satisfied, then $A^{-1}$ can be expressed by the convergent series $$\underline{A}^{-1}=\underline{I}+\underline{B}+\underline{B}^2+\ldots+\underline{B}^n+\ldots. \tag{13}$$

Using Eqs. (12) and (13) the solution can be written as follows:

$$\underline{x}=\underline{b}+\underline{B}\underline{b}+\underline{B}^2\underline{b}\ldots+\underline{B}^n\underline{b}+\ldots. \tag{14}$$

The convergence of Eq. (14) is strongly dependent on the value of $||B||$. For larger values of $||B||$, more terms of the series in Eq. (14) are required to represent $\underline{x}$ accurately.

One advantage of the Monte Carlo technique is that it is possible to calculate one element $x_m$ of the solution, without having to determine the entire vector $\underline{x}$. From Eq. (14) and m-th component, $x_m$, of the vector $\underline{x}$ may be written as $$x_m = b_m + \sum_i B_{mi}b_i + \sum_{i_1,i_2} B_{mi_1}B_{i_1i_2}b_{i_2} + \ldots + \sum_{i_1,i_2\ldots,i_r} B_{mi_1}B_{i_1i_2}\ldots B_{i_{r-1}i_r}b_{i_r} + \ldots. \tag{15}$$

The Monte Carlo method to compute $x_m$ is to play a solitaire game $\underline{G_m}$ whose expected value is $x_m$. A random variable $\underline{G_m}$ is constructed in the following manner. Each element $B_{mi}$ of the matrix B is represented by two factors $$B_{mi}=V_{mi}P_{mi}, \tag{16}$$

where $P_{mi}$ denotes a probability such that $$\sum_{i=1}^{n} P_{mi} \leqq 1,$$

and $V_{mi}$ represents a "value factor". The elements of the vector $\underline{b}$ will be represented as $$b_m=v_m p_m, \tag{17}$$

where $p_m$ represents a "stop" probability and is defined by the equation $$p_m = 1 - \sum_{i=1}^{n} P_{mi} \tag{18}$$

$v_m$ is a "value factor" associated with the vector element $b_m$.

In this section the game $\underline{G_m}$ will be expressed in terms of drawing balls from urns. Consider the problem of mapping balls and urns into photons and matrix elements. However, for now assume that we have n urns, and each urn contains $n+1$ distinct types of balls. Each ball of the i-th type will be drawn from the m-th urn $U_m$ with probability $P_{mi}$, where $i=1,2,\ldots,n$. The probability that the $(n+1)$-th type of ball (labeled STOP) is drawn from urn $U_m$ is $p_m$, as given in Eq. (18).

The game $\underline{G_m}$ is defined as follows. First draw a ball from urn $U_m$ (all drawings are with replacement). If it is a STOP ball, then the random variable $\underline{G_m}$ is given the value $v_m$; but if a ball of the $i_l$-th type (labeled $i_l$) is drawn, then one is to draw a ball from urn $U_{il}$. This sequence of draws from the urns $$m, i_1, i_2, \ldots i_r$$

continues until a stop ball is drawn from urn $U_{ir}$, whereby the random variable $\underline{G_m}$ is given the value $$G_m=V_{mi_1}V_{i_1i_2}\ldots V_{i_{r-1}i_r}v_{i_r} \tag{19}$$

The probability that the random variable $\underline{G_m}$ takes this value is $P_{mi_1}P_{i_1i_2}\ldots P_{i_{r-1}i_r}p_{i_r}$. The expected value of the variable $\underline{G_m}$ is $$<G_m> = \sum_{i_1i_2,\ldots i_r} V_{mi_1}V_{i_1i_2}\ldots V_{i_{r-1}}v_{i_r}P_{mi_1}P_{i_1i_2}\ldots P_{i_{r-1}i_r}P_{i_r} \tag{20}$$

where $< \ldots >$ indicates an average over an ensemble of realizations. Comparing Eqs. (15) and (20), one finds that $$x_m=<G_m>. \tag{21}$$

Thus, by calculating the expected value of variable $\underline{G_m}$ one can determine the solution for vector element $x_m$.

J. H. Curtiss, "A Theoretical Comparision of the Efficiencies of Two Classical Methods and a Monte Carlo Method for Computing One Component of the Solution of a Set of Liner Algebraic Equations," in *Symposium on Monte Carlo Methods*, H. A. Meyer, ed. (Wiley, New York, 1956), 191–233, has compared the theoretical efficiency of two classical methods and the von Neumann-Ulam Monte Carlo method for computing one component fo the solution of a system of linear algebraic equations. The classical methods considered were the Gauss elimination method and a particular linear iterative method. Curtiss concluded that the Monte Carlo method is theoretically more efficient than the classical method for sufficiently large values of n. In Curtiss an interesting table that summarizes the favorable range of dimensionality for the three methods is given. For example, if $||B||$ is 0.5 and the required accuracy is 0.10, then the Monte Carlo method is the most efficient when the dimensionality $n \geqq 21$. If $||B||$ is 0.5 and the required required accuracy is 0.01, then $n \geqq 152$ for the Monte Carlo method to be the most efficient.

In the optical realization of the von Neumann-Ulam Monte Carlo method, a matrix with elements of exitance $I_{ij}$ is displayed on the CRT input device 14 (FIG. 3). The matrix has n rows and n+1 columns. We will take the m-th row of the matrix to correspond to the m-th urn described in the previous section. Also, we will take each column of the matrix to correspond to a different type of ball.

The CRT screen is imaged onto the photon event counting 20 detector. The light level at the detector is reduced to an acceptable level by inserting a neutral density filter 30 or by stopping down the aperture of the imaging system with the pinhole camera 28.

From Eq. (1) the probability $P_{mi}$ that a photoevent is detected at spatial coordinates $(x_m, y_i)$ is related to the exitance of the associated matrix element on the CRT by the equation $$P_{mi} = \frac{I_{mi}}{\sum_{i=1}^{n+1} I_{mi}} \tag{22}$$

where $I_{mi}$ is the exitance of the matrix element in the m-th row and i-th column. In writing Eq. (22) it is considered that the matrix elements (the squares in the checkerboard display 14) have the same area.

The output of the position-computing electronics is the digital address for the x and y spatial coordinates of the detected photoevent.

The procedure to compute the m-th component of x, Eq. (15), goes as follows. Suppose that a photoevent is detected at coordinates $(x_m, y_{i1})$, corresponding to the matrix element in the m-th row and $i_1$-th column; this event begins the chain calculation. With this event the computer program associates the value $V_{mi1}$ as prescribed by Eq. (16), and assigns the random variable $\underline{G}_m$ the value $V_{mi1}$. Upon detection of a photoevent from the $i_1$-th row, at say location $(x_{i1}, y_{i2})$, the computer multiplies the variable $G_m = V_{mi1}$ times $V_{i1i2}$ to get $G_m = V_{mi1}V_{i1i2}$.

This process continues until a photoevent is detected from the (n+1)th column in row $i_r$. With the event from the (n+1)-th column, the chain is terminated and the variable $\underline{G}_m$ is assigned the value $$G_m = V_{mi1}V_{i1i2} \ldots v_{ir} \tag{23}$$

With the reasoning given above, it follows that the mean value of $\underline{G}_m$, computed from an ensemble of realizations, is an approximate solution for the vector component $x_m$ (see Eq. (21)).

Note that if the entire vector x is to be evaluated, then a calculation is performed for each detected photoevent. The computer program first checks to see if the event can be added to the chain calculation of an existing variable; if not, a new chain is started.

On the other hand, if only the m-th component of x is required, then upon the detection of a photoevent the program checks to see if the event can be added to an existing chain; if not, a new chain is started only if the photoevent occurred in the m-th row.

It will therefore be apparent that there has been provided an opto-electronic system which generates random numbers in accordance with specified probability functions. The invention provides opto-electronic computer systems utilizing such random number generators which operate in accordance with Monte Carlo or other random processes for the solution of various problems. Variations and modifications of the herein described systems will undoubtedly suggest themselves to those skilled in the art. Accordingly, the foregoing description should be taken as illustrative and not in a limiting sense.

What is claimed is:

1. In a system which utilizes random numbers, a random number generator which comprises means for detecting photoevents, means for illuminating said detecting means with an image having a specified intensity distribution, and means responsive to the photoevents detected by said detecting means for deriving random number outputs having a probability density in accordance with said distribution and in accordance with the spatial coordinates of the photoevents detected by said detecting means.

2. The system according to claim 1 wherein said illuminating means comprises means for generating a display having said intensity distribution, and means for limiting the intensity of light reaching said detecting means such that said photoevents occur at a specified rate.

3. The system according to claim 2 wherein said display generating means comprises a cathode-ray tube display on which said images produced, and computer means for operating said display.

4. The system according to claim 3 wherein said matrix is a checkerboard pattern having a plurality of squares where the relative intensity of each square is proportional to the probability of a transition between the states of a Markov process, the transition probabilities of which are represented as said matrix.

5. The system according to claim 2 wherein said display generating means includes means for generating said image as a matrix, and computer means operative in accordance with a Monte Carlo program for providing an output approximately the inverse of said matrix in response to said random number outputs.

6. The system according to claim 1 further comprising means for computing solutions in accordance with a Monte Carlo program in response to said random number outputs.

7. A random number generating system which comprises means for providing an image constituted of photons incident on an area, opto-electronic means for detecting the photons of said image incident on said area, and means for providing random number outputs in accordance with the spatial coordinates of said incident photons.

8. The system according to claim 7 wherein said image providing means includes means for generating said image with a specified intensity distribution over said area whereby said random number outputs occur with a probability density corresponding to said intensity distribution.

9. The system according to claim 7 wherein said imaging means includes means for limiting said intensity such that photons are detected by said opto-electronic means at a specified rate.

10. The system according to claim 4 wherein said rate is of the order of one photon every ten microseconds.

11. The system according to claim 4 wherein the means for providing said image and limiting the intensity thereof comprises a pinhole camera.

12. The system according to claim 9 wherein said means for providing said image and limiting the intensity thereof comprises an imaging lens and a filter with sufficient neutral density to reduce the photoevents at said area to said specified rate.

13. The system according to claim 7 wherein said opto-electronic means comprises two dimension photon event detector means.

14. The system according to claim 13 wherein said two-dimensional photon event detector means comprises a photodetector having a photocathode which defines said area, and means for detecting the spatial coordinates of said photoevents at said photocathode.

15. The system according to claim 14 wherein said spatial coordinate detector means comprises means for detecting the positions on said photocathode of the electrons emitted in response to the photons incident on said photocathode.

16. The system according to claim 15 wherein said photodetector comprises said photocathode, means for multiplying said emitted electrons, and a resistive anode on which said multiplied electrons are incident, and said position detector means comprises position computer means connected to said anode for providing the spatial coordinates of the centroid of the charge collected in response to each group of multiplied electrons corresponding to each photon incident on said photocathode.

* * * * *